United States Patent [19]
McManus et al.

[11] Patent Number: 5,961,697
[45] Date of Patent: Oct. 5, 1999

[54] BULK STORAGE AND DISPENSING SYSTEM FOR FLUIDS

[75] Inventors: James V. McManus, Danbury; Dennis F. Brestovansky, Sandy Hook; Peter S. Kirlin, Bethel, all of Conn.

[73] Assignee: Advanced Technology Materials, Inc., Danbury, Conn.

[21] Appl. No.: 08/859,651

[22] Filed: May 20, 1997

Related U.S. Application Data

[60] Provisional application No. 60/018,060, May 20, 1996.

[51] Int. Cl.⁶ .................................................. B01D 53/047
[52] U.S. Cl. ................................ 96/126; 55/356; 96/130; 96/146; 96/152
[58] Field of Search ............................... 96/108, 112, 113, 96/126–128, 130, 134–144, 146, 152; 55/356

[56] References Cited

U.S. PATENT DOCUMENTS

| | | | |
|---|---|---|---|
| 2,965,196 | 12/1960 | Rich, Jr. | 96/130 X |
| 3,384,976 | 5/1968 | Westeren | 96/144 X |
| 3,776,283 | 12/1973 | Kramer et al. | 96/152 X |
| 3,996,975 | 12/1976 | Hansel | 96/144 X |
| 4,744,221 | 5/1988 | Knollmueller | 62/48 |
| 4,793,832 | 12/1988 | Veltman et al. | 95/14 |
| 4,983,190 | 1/1991 | Verrando et al. | 96/130 X |
| 5,298,054 | 3/1994 | Malik | 95/104 X |
| 5,350,442 | 9/1994 | Thelen et al. | 95/15 X |
| 5,512,087 | 4/1996 | Varner et al. | 96/113 X |
| 5,518,528 | 5/1996 | Tom et al. | 95/103 |
| 5,704,965 | 1/1998 | Tom et al. | 95/95 |

*Primary Examiner*—Robert Spitzer
*Attorney, Agent, or Firm*—Steven J. Hultquist; Oliver A. M. Zitzmann

[57] ABSTRACT

A fluid storage and dispensing system includes a storage and dispensing vessel containing a solid-phase physical sorbent material for holding a sorbable fluid, and a motive transport assembly associated with the storage and dispensing vessel. The storage and dispensing vessel is arranged for selectively flowing fluid into the vessel for storage, and out of the vessel for dispensing. The sorbable fluid physically adsorbed on the solid-phase physical sorbent medium may be selectively desorbed by pressure differential desorption and/or thermal desorption, to dispense gas when the vessel is in motive transport and/or when the vessel is at rest.

20 Claims, 4 Drawing Sheets

BULK STORAGE AND DISPENSING SYSTEM FOR FLUIDS

CROSS-REFERENCE TO RELATED APPLICATION

This application is based on and claims priority of U.S. Provisional Pat. Application No. 60/018,060 filed May 20, 1996.

BACKGROUND OF THE INVENTION

1. Field of the Invention

This invention relates generally to storage and dispensing systems for the selective dispensing of fluids from a vessel in which the fluid component(s) are sorptively retained by a solid sorbent medium, and are desorptively released from the sorbent medium in the dispensing operation. More particularly, the present invention relates to a bulk storage and dispensing system of such type.

2. Description of the Related Art

In a wide variety of industrial processes and applications, there is a need for a reliable source of process fluid(s) which is compact, portable, and available to supply the fluid(s) on demand. Such processes and applications include semiconductor manufacturing, ion implantation, manufacture of flat panel displays, medical treatment, water treatment, emergency breathing equipment, welding operations, space-based applications involving delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapid increasing interior gas pressure in the cylinder.

The gas storage and dispensing vessel of the Tom et al. patent thus reduces the pressure of stored sorbate gases by reversibly adsorbing them onto a carrier sorbent, e.g., a zeolite or activated carbon material.

Many industrial applications exist wherein a bulk storage and dispensing system for fluids is highly advantageous and wherein existing high pressure storage tanks present substantial risks and safety issues, relative to leakage and rupture of such tanks.

It therefore is an object of the present invention to provide such a bulk storage and dispensing system which overcomes the aforementioned disadvantages of the prior art utilization of high pressure storage and dispensing tanks.

Other objects and advantages of the invention will be more fully apparent from the ensuing disclosure.

SUMMARY OF THE INVENTION

The present invention relates to a fluid storage and dispensing system including a storage and dispensing vessel containing a solid-phase physical sorbent material for holding a sorbable fluid, and a motive transport assembly associated with the storage and dispensing vessel. The storage and dispensing vessel is arranged for selectively flowing fluid into the vessel for storage, and out of the vessel for dispensing. The sorbable fluid physically adsorbed on the solid-phase physical sorbent medium may be selectively desorbed by pressure differential desorption and/or thermal desorption, to dispense gas when the vessel is in motive transport and/or when the vessel is at rest.

In a particular aspect, the present invention relates to a bulk vehicular transport fluid storage and dispensing system, comprising:

a storage and dispensing vessel constructed and arranged for holding a solid-phase physical sorbent medium, and for selectively flowing fluid into and out of the vessel;

a solid-phase physical sorbent medium disposed in the storage and dispensing vessel;

a sorbable fluid physically adsorbed on the solid-phase physical sorbent medium; and a motive transport vehicular assembly structurally coupled to the storage and dispensing vessel for motive transport of the storage and dispensing vessel.

Such bulk vehicular transport fluid storage and dispensing system may further comprise a filling and dispensing assembly coupled in gas flow communication with the storage and dispensing vessel, and constructed and arranged to effect pressure differential-mediated desorption and/or thermally-mediated desorption of sorbable fluid from the solid-phase physical sorbent medium, and flow of desorbed fluid through the dispensing assembly.

As used herein, the term "pressure differential-mediated desorption" means desorption that is effected under a pressure condition that causes the sorbed fluid on the sorbent material to be desorbed from the sorbent material. Such pressure condition may involve a differential in pressure between the immediate environment of the sorbent in the interior of the vessel containing the sorbent material bed, and the exterior environment of the vessel. Thus, if the vessel contains the sorbent bed at a pressure condition which is greater than the pressure condition outside the vessel to which the interior volume is being discharged, then gas will flow to the exterior locus from the interior of the vessel, and gas will be desorbed from the sorbent material in the interior volume of the vessel.

As used herein, the term "thermally-mediated desorption" means the desorption of fluid from the sorbent material that occurs when the sorbent material is heated.

Desorption of the sorbed fluid from the sorbent material in the practice of the present invention may be carried out in any suitable manner, and may include pressure-differential mediated desorption (which may be effected by pumping or imposing suction on the vessel containing the sorbent material holding the sorbed fluid) and/or thermally-mediated desorption.

The bulk vehicular transport fluid storage and dispensing system of the invention may further comprise, in a particular embodiment, a heating/cooling coil contained within the storage and dispensing vessel, with the coil coupled in circuit-forming relationship to a source of heat exchange fluid. The heat exchange fluid may for example comprise a coolant for chilling the solid-phase physical sorbent medium to increase adsorption, or it may comprise a heated fluid for heating the solid-phase physical sorbent medium to thermally assist desorption.

The bulk vehicular transport fluid storage and dispensing system of the invention may be of any suitable type. It may for example include wheels or tires for motive transport of the storage and dispensing vessel, e.g., a wheeled flat bed trailer for motive vehicular transport of the storage and dispensing vessel. As another example, the storage and dispensing vessel may be detachably mounted to such a flat bed trailer. Still other examples include a railroad car for motive vehicular transport of the storage and dispensing vessel, a rocket assembly, ship, barge, etc. In another preferred aspect, the gas storage and dispensing system may constitute a portion of a rocket assembly, in which the storage and dispensing vessel constitutes a casing which may for example define part of a booster stage of a rocket, or other component structure or part thereof.

In the bulk vehicular transport fluid storage and dispensing system of the invention, a plurality of storage and dispensing vessels may be mounted to the motive transport vehicular assembly.

Another aspect of the invention relates to a bulk vehicular transport fluid storage and dispensing system, comprising a vessel containing a sorbent material having sorptive affinity for a fluid which is desorbable by pressure-mediated desorption and/or thermally-mediated desorption of the fluid from the sorbent material, a motive transport vehicular assembly mounting the vessel thereon, an on-board refrigeration source on the motive transport vehicular assembly, an on-board heat source on the motive transport vehicular assembly, and means for selectively chilling and heating the sorbent material in the vessel with the on-board refrigeration source and the on-board heat source, respectively.

Such a bulk vehicular transport fluid storage and dispensing system may for example comprise a space vehicle.

The sorbent medium in the storage and dispensing system may include any suitable sorbent material. Preferred substrates include crystalline aluminosilicate compositions, e.g., with a pore size in the range of from about 4 to about 13 Å, although crystalline aluminosilicate compositions having larger pores, e.g., so-called mesopore compositions with a pore size in the range of from about 20 to about 40 Å are also potentially usefully employed in the broad practice of the invention.

Examples of such crystalline aluminosilicate compositions include 5A molecular sieve, and preferably a binderless molecular sieve.

Potentially useful carbon sorbent materials include so-called bead activated carbon of highly uniform spherical particle shape, e.g., BAC-MP, BAC-LP, and BAC-G-70R, available from Kreha Corporation of America, New York, N.Y.

Although carbon sorbents and molecular sieve materials such as crystalline aluminosilicates are preferred in many instances, the solid-phase physical sorbent medium may usefully comprise other materials such as silica, alumina, macroreticulate polymers, kieselguhr, etc.

The sorbent materials may be suitably processed or treated to ensure that they are devoid of trace components which deleteriously affect the performance of the gas storage and dispensing system. For example, carbon sorbents may be subjected to washing treatment, e.g., with hydrofluoric acid, to render them sufficiently free of trace components such as metals and oxidic transition metal species.

The form of the invention may be widely varied, including for example a container for cargo shipment of the vessel. The bulk vehicular assembly of the invention may comprise a storage and dispensing vessel, with or without a fluid dispensing assembly therefor. In other words, the apparatus of the invention may have a native or "on-board" dispensing assembly, or the dispensing means may be stationary in character, being deployed only when the motive vehicle including the bulk storage and dispensing assembly is brought to a destination where the stationary dispensing assembly resides.

Other aspects and features of the invention will be more fully apparent from the ensuing disclosure.

BRIEF DESCRIPTION OF THE DRAWINGS

These and other features, aspects, and advantages of the present invention will become better understood when the following detailed description is read with reference to the accompanying drawings wherein.

DETAILED DESCRIPTION OF THE INVENTION, AND PREFERRED EMBODIMENTS THEREOF

The disclosure of U.S. Pat. No. 5,518,528 issued May 21, 1996 in the names of Glenn M. Tom and James V. McManus, and the disclosure of U.S. Pat. No. 5,704,965 issued Jan. 6, 1998 in the names of Glenn M. Tom and James V. McManus for "FLUID STORAGE AND DELIVERY SYSTEM UTILIZING CARBON SORBENT MEDIUM," hereby are incorporated herein by reference in their entirety.

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

Figure 1:
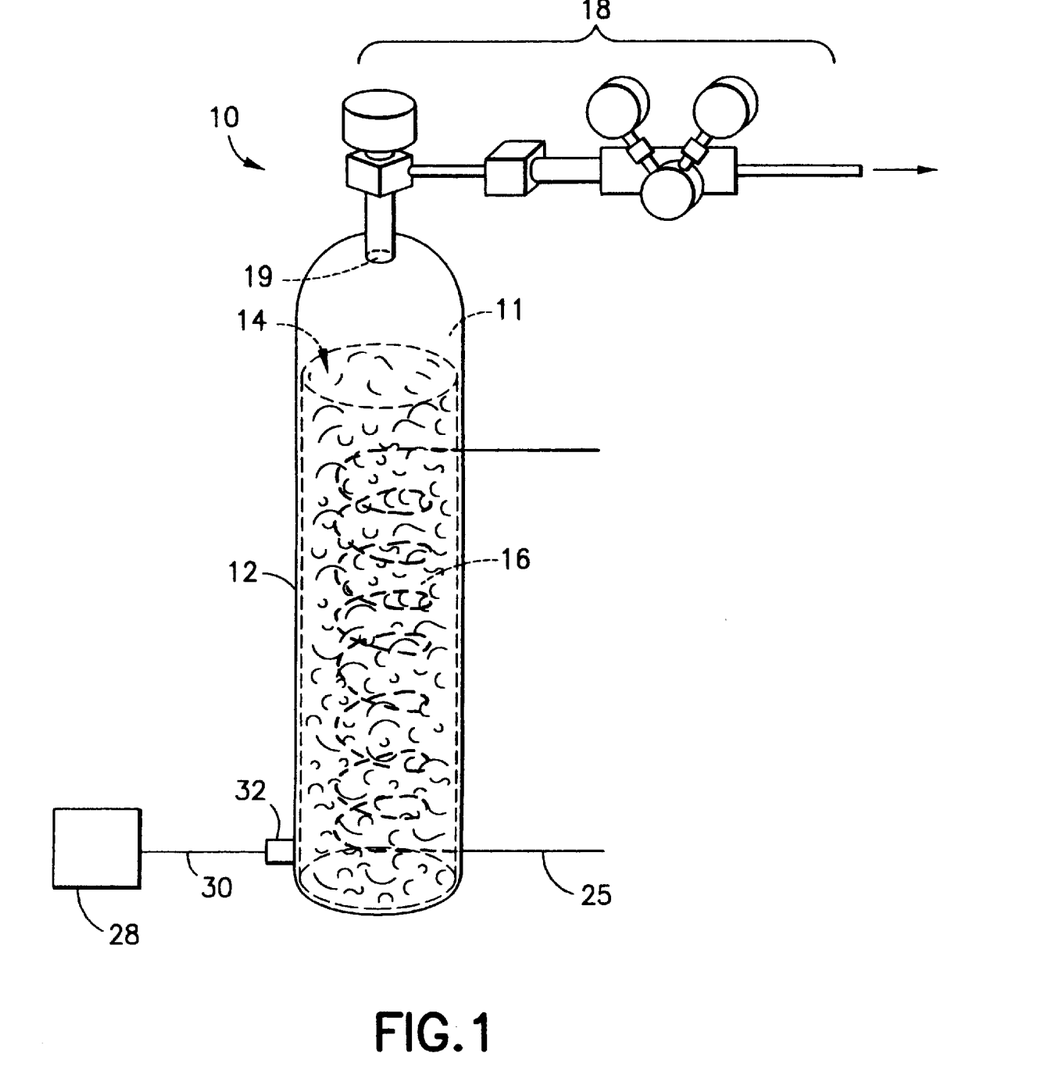
FIG. 1 is a schematic perspective representation of a storage and dispensing vessel and associated flow circuitry according to one embodiment of the invention, which may be usefully employed for the storage and dispensing of fluid.

Referring now to the drawings, FIG. 1 is a schematic representation of a storage and dispensing system 10 comprising storage and dispensing vessel 12. The storage and dispensing vessel may for example comprise a conventional gas cylinder container of elongate character. In the interior volume of such vessel is disposed a bed 14 of a suitable sorbent medium 16.

The vessel 12 is provided at its upper end with a conventional cylinder head fluid dispensing assembly 18 coupled with the main body of the cylinder 12 at the port 19. Port 19 allows fluid flow from the interior volume 11 of the cylinder into the dispensing assembly 18. To prevent entrainment of particulate solids in the fluid being dispensed from the cylinder, the port 19 may be provided with a frit or other filter means therein.

The vessel 12 may be provided with internal heating means (not shown) which serve to thermally assist desorption of the sorbate fluid. Preferably, however, the sorbate fluid is at least partially, and most preferably fully, dispensed from the storage and dispensing vessel containing the adsorbed fluid by pressure differential-mediated desorption. Such pressure differential may be established by flow communication between the storage and dispensing vessel, on the one hand, and the exterior dispensing environment or locus of use, on the other.

The sorbent medium 16 may comprise any suitable sorptively effective material, having sorptive affinity for the fluid to be stored and subsequently dispensed from the vessel 12, and from which the sorbate is suitably desorbable. Examples include a crystalline aluminosilicate composition, e.g., a micropore aluminosilicate composition with a pore size in the range of from about 4 to about 13 Å, a mesopore crystalline aluminosilicate composition with a pore size in the range of from about 20 to about 40 Å, a carbon sorbent material such as a bead activated carbon sorbent of highly uniform spherical particle shape, e.g., BAC-MP, BAC-LP, and BAC-G-70R bead carbon materials (Kureha Corporation of America, New York, N.Y.), silica, alumina, macroreticulate polymers, kieselguhr, etc.

The sorbent material may be suitably processed or treated to ensure that it is devoid of trace components which may deleteriously affect the performance of the fluid storage and dispensing system. For example, the sorbent may be subjected to washing treatment, e.g., with hydrofluoric acid, to render it sufficiently free of trace components such as metals and oxidic transition metal species.

The sorbent may be provided in the form of particles, granules, extrudates, powders, cloth, web materials, honeycomb or other monolithic forms, composites, or other suitable conformations of useful sorbent materials, having sorptive affinity for the fluid sought to be stored and subsequently dispensed, and satisfactory desorption characteristics for the dispensing operation.

As mentioned, although it generally is preferred to operate solely by pressure differential, in respect of the sorption and desorption of the gas to be subsequently dispensed, the system of the invention may in some instances advantageously employ a heater operatively arranged in relation to the storage and dispensing vessel for selective heating of the solid-phase physical sorbent medium, to effect thermally-enhanced desorption of the sorbed fluid from the solid-phase physical sorbent medium.

The apparatus of the invention optionally may be constructed with a solid-phase physical sorbent medium being present in the storage and dispensing vessel together with a chemisorbent material having a sorptive affinity for contaminants, e.g., decomposition products, of the sorbate fluid therein.

Figure 2:
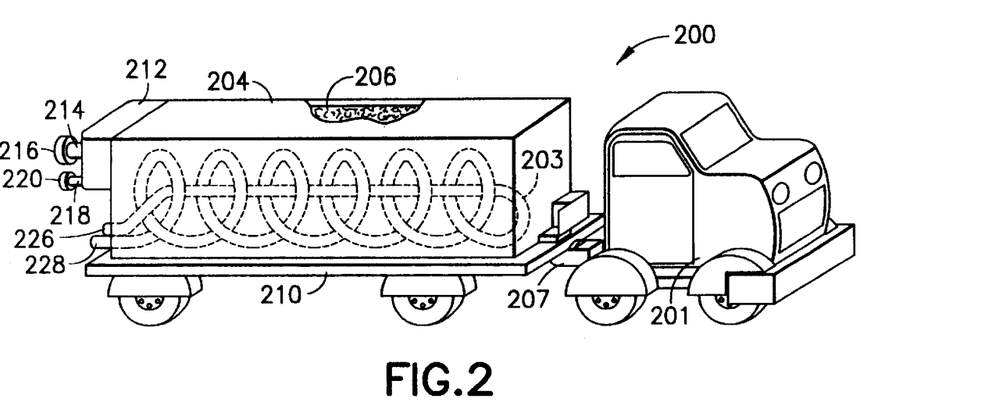
FIG. 2 is a schematic perspective view of a trailer-mounted fluid storage and dispensing system, according to one embodiment of the invention.

FIG. 2 is a schematic perspective view of a trailer-mounted fluid storage and dispensing system 200, according to one embodiment of the invention. The storage and dispensing system 200 comprises a storage and dispensing vessel 204 containing a sorbent bed 206 of suitable sorbent material having sorptive affinity, and good desorption release characteristics, for the fluid to be stored and selectively dispensed from the vessel. The sorbent bed contains a sorbate medium thereon, as loaded for storage pending subsequent use. The vessel 204 is in the form of a container which may be insulated, refrigerated, or otherwise constructed and arranged, to keep the sorbent therein at a predetermined temperature condition for retention of the sorbate fluid, and minimization of premature desorption from the sorbent bed.

The container constituting the vessel 204 is provided with a fill/dispense module 212 including a fill port 214 for initial introduction of the sorbable fluid into the sorbent bed 206, and a discharge port 216 for dispensing the sorbable fluid by desorbing same from the adsorbent bed, either by pressure differential and/or thermally-assisted desorption conditions. In this respect, the container is provided with a heating/cooling coil 203 in the bed, with exterior coupleable end portions 226 and 228 which may be coupled in circuit-forming fashion to a source of heat exchange fluid.

The heat exchange fluid may comprise a coolant for chilling the bed to maximize sorptive take up of sorbable fluid when the sorptive fluid is initially introduced to the sorbent bed through fill port 214, by offsetting or ameliorating the heat of adsorption effects of such sorptive take-up of the sorbable fluid.

Alternatively, the heat exchange fluid may comprise a hot fluid to heat the bed at the time of dispensing, so as to thermally assist the desorption process, for egress of fluid through the discharge port 216.

As shown, the container vessel 204 is mounted on a wheeled flat bed trailer 210 provided with coupling structure 207 for connecting the trailer portion comprising the container vessel and the flat bed, to the tractor 201, to yield the illustrated tractor-trailer assembly. It may be useful in some instances for the container vessel to be detachably secured to the flat bed, so that the container vessel can be unitarily removed from or installed on the flat bed trailer 210. For example, the container vessel may be removed from the flat bed trailer 210 and placed as containerized cargo on a ship or barge for oceanic or riparian shipment.

Figure 3:
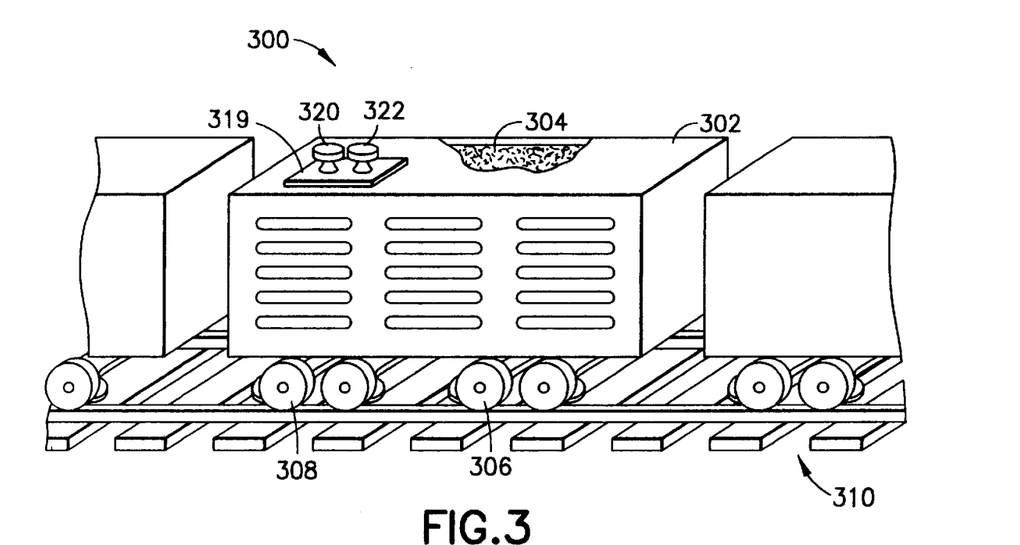
FIG. 3 is a schematic perspective view of a railroad car comprising a fluid storage and dispensing system according to another embodiment of the invention.

FIG. 3 is a schematic perspective view of a railroad car 300 comprising a fluid storage and dispensing system according to another embodiment of the invention.

The railroad car 300 as shown comprises a sorbent bed 304 therein within enclosing walls and top and floor members constituting a containment vessel 302 which may be sealed hermetically or otherwise be made leak-tight in relation to the ambient environment.

The railroad car 300 features a fill/dispense module 319 on its top wall member, including fill port 320 and dispense port 322. The railroad car has a conventional boxcar shape and general conformation, and is mounted on wheel assemblies 306 and 308 as shown for translation along track 310 in coupled motive relationship to locomotive or other driver means.

The mobile fluid storage and dispensing system may optionally include a pump and compressor arrangement to motively deliver, or pump, the sorbate into a compressor for delivery to an application. A smaller and, perhaps, mobile reservoir tank may also be included; the reservoir tank would be refilled from the larger vessel and used as needed in an application.

Figure 4:
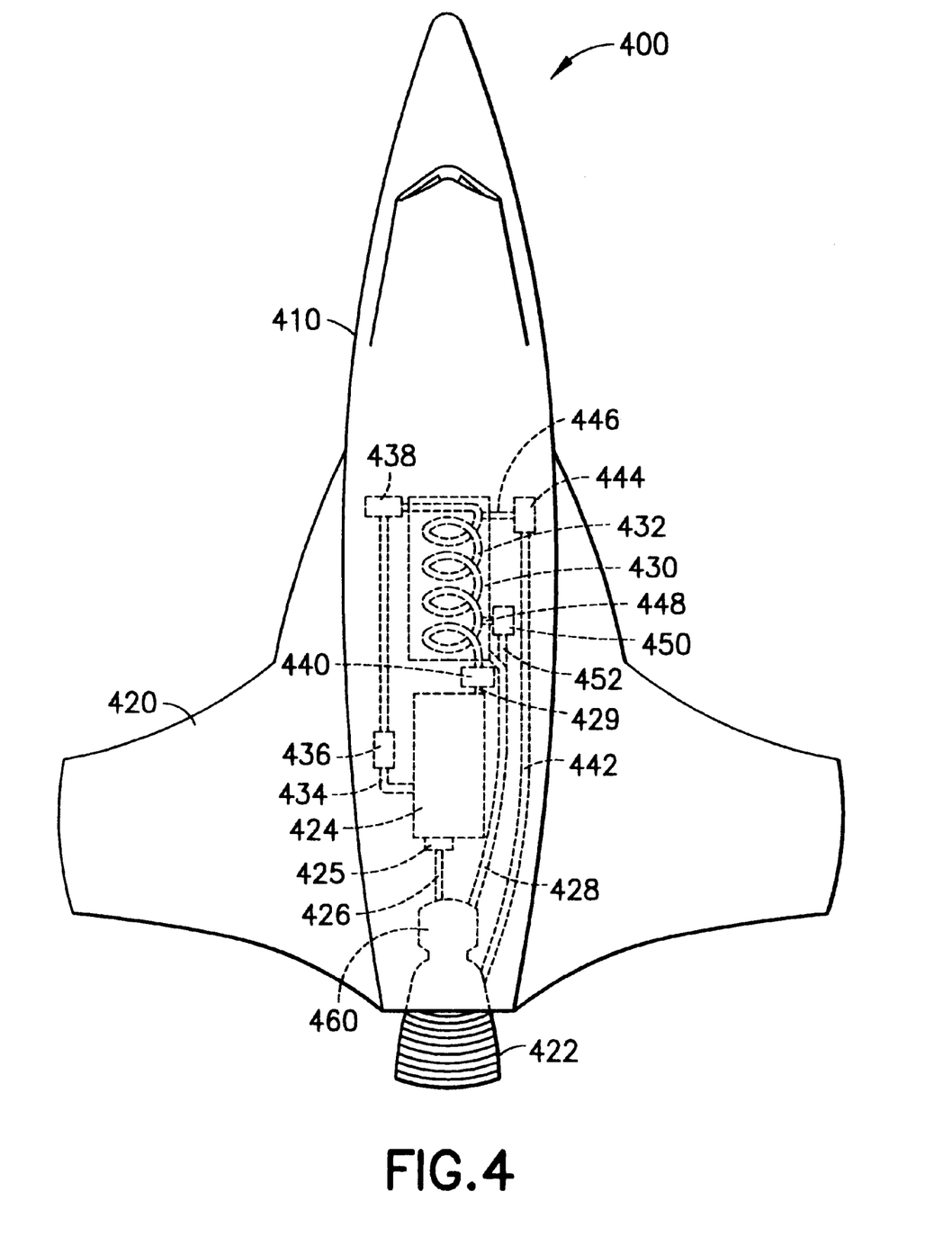
FIG. 4 is a top plan view of a space vehicle, incorporating an oxidizable fuel component as the sorbed gas in the bulk storage and dispensing vessel, which is operatively integrated with an oxidant system to facilitate highly efficient dispensing of both fuel and oxidant.

FIG. 4 is a top plan view of a space vehicle, incorporating an oxidizable fuel component as the sorbed gas in the bulk storage and dispensing vessel, which is operatively integrated with an oxidant system to facilitate highly efficient dispensing of both fuel and oxidant.

As illustrated, the space vehicle 400 includes a main body vehicular portion 410 equipped with laterally extending wings 420. At the rear portion of the vehicle is a nozzle 422 of the engine 460, which in propulsion operation of the vehicle receives oxidant via oxidant feed line 426 from cryogenic liquid oxygen tank 424, which is coupled with liquid oxygen vaporizer 425.

The engine 460 during propulsion operation of the vehicle concurrently receives fuel from storage and dispensing vessel 430, which is constructed to contain a bed of sorbent having selective sorption affinity for the gas constituting the fuel.

In a storage mode, the fuel gas is sorptively retained on the sorbent material, with the sorbent in the bed (not shown) being cryogenically cooled by circulation of liquid oxygen through the heat exchange coils 432 disposed in the sorbent bed in vessel 430. This cooling is effected by flowing liquid oxygen from the liquid oxygen tank 424 through line 434 by the action of liquid oxygen pump 436. Line 434 contains flow control valve 438 therein which is open when the flow of oxygen is desired.

The liquid oxygen thereby flows into and through the heat exchange coils 432 in the vessel containing the sorbent bed, being returned to the liquid oxygen tank in line 429 operatively controlled by the control unit 440.

The control unit may comprise a flow control valve which is selectively openable or closeable to recycle or shut off the flow of oxygen to the tank 424 from the cooling coils. The control unit may also include a condenser or other means for re-liquefying the oxygen in the event that the heat gain by the liquid oxygen in chilling the sorbent bed causes the gasification of the liquid oxygen. If the liquid oxygen is gasified in the cooling coils 432, then the resulting cold oxygen gas may be employed as part of a pressure-building circuit to facilitate the positive-pressure pumping of the liquid oxygen from the tank 424 to the vaporizer 425 and the engine of the craft in which fuel is oxidized. Alternatively, gasified oxygen may simply be flowed from the cooling coils 432 to the engine, for mixing with the fuel gas.

When the fuel vessel is converted from a storage mode to a dispensing mode, the chilling with liquid oxygen is terminated, by closing the valve 438 (and the valve in the control unit 440), and control units 444 and 450 open valves therein. Hot fluid from the nozzle 422 then is pumped by the control unit 444 through line 442 and input line 446 to the heat exchange coils 432, for flow therethrough. The hot fluid after passage through the heat exchange coils 432 then is discharged in discharge line 448 and passed by control unit 450 through branch line 452 to flow conduit 428 from which the hot fluid is recycled to the engine 460 of the vehicle.

During this heating of the sorbent bed in vessel 430, the sorbent releases the sorptively held fuel, and same is discharged from vessel 430 into flow conduit 428 and is flowed with the recycle hot fluid to the engine 460 for oxidation thereof in the presence of oxygen gas as the oxidizing medium.

By this arrangement, the heat duty of the combustion gases is recovered and used to heat the sorbent bed to desorb the fuel from the sorbent medium. Since the combustion gases are at very high temperature, it is possible to use as the fuel medium a gas which has a very strong sorptive affinity for the sorbent material being employed. Further, since the sorptive material is cooled to cryogenic temperature regimes by the liquid oxygen, very high loading of the fuel gas can be achieved, to enhance the economics of the vehicular operation.

Figure 5:
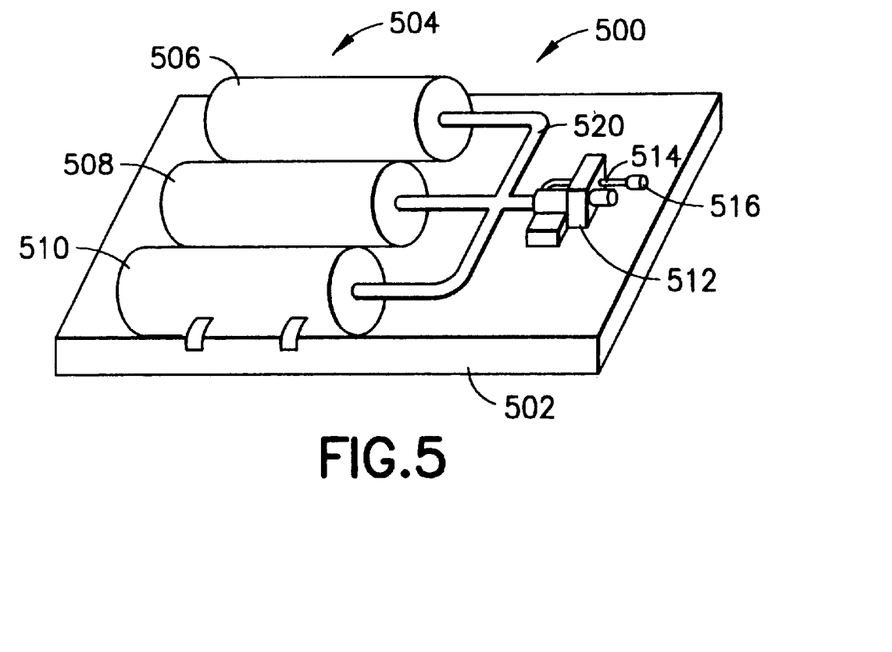
FIG. 5 is a schematic perspective view of a barge assembly including the storage and dispensing vessel of the invention.

FIG. 5 is a schematic perspective view of a barge assembly 500 including a storage and dispensing vessel array 504. In this illustrated embodiment, the barge 502 has mounted thereon a multiplicity of storage and dispensing vessels 506, 508 and 510, secured to the upper deck face of the barge. The respective vessels 506, 508 and 510 are each joined to a manifold 520 associated with a pump and compressor assembly 512 which in turn is joined to a discharge line 514 and coupling 516. The coupling 516 enables the barge-based storage and dispensing system to be joined to end use facilities for the sorbate gas held in the sorbent bed in the vessels 506, 508 and 510.

Figure 6:
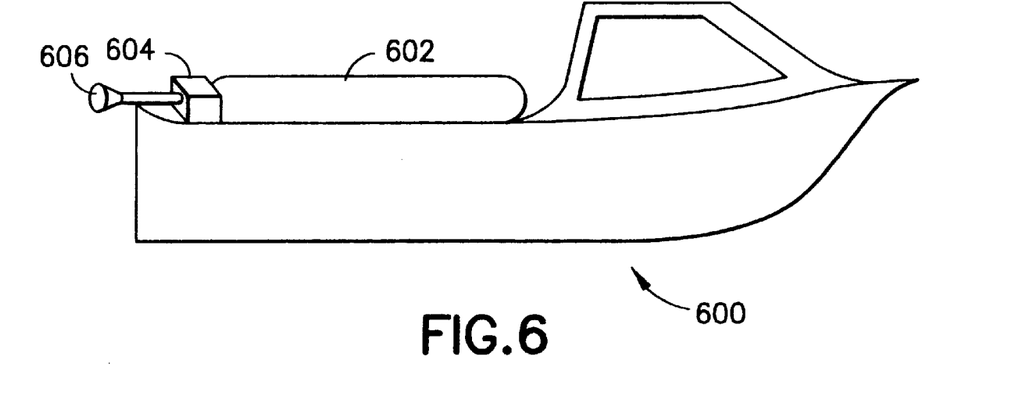
FIG. 6 is a schematic elevation view of a ship including a storage and dispensing vessel according to the invention.

FIG. 6 is a schematic elevation view of a ship 600 including a storage and dispensing vessel 602 according to the invention. The vessel 602 may for example hold a sorbate gas having efficacy for treatment of riparian waters to combat deleterious conditions. The vessel 602 is coupled with a dispensing assembly 604 including a nozzle 606 for dispersing desorbed sorbate gas from the vessel. For this purpose, the dispensing assembly may include valving and flow regulator elements, and other means for monitoring and/or controlling the gas flow from the vessel 602.

As discussed earlier herein, the storage and dispensing vessel of the invention may assume a wide variety of other forms, for bulk storage and dispensing of any of a wide variety of sorbable fluids which are adsorptively retained on and readily desorbed from the sorbent material, which may also be constituted by any of a wide variety of suitable sorbent media.

Thus, while the invention has been shown and described with reference to specific features, aspects and embodiments herein, it will be appreciated that the invention is susceptible of a wide variety of other embodiments, features and implementations consistent with the disclosure herein, and the invention is therefore to be broadly construed and interpreted, within the spirit and scope of the foregoing disclosure.

What is claimed is:

1. A bulk vehicular transport fluid storage and dispensing system, comprising:

a storage and dispensing vessel constructed and arranged for holding a solid-phase physical sorbent medium, and for selectively flowing a gas reagent out of said vessel, without a simultaneous flow of gas into the vessel;

a solid-phase physical sorbent medium disposed in said storage and dispensing vessel;

a gas reagent physically adsorbed on said solid-phase physical sorbent medium and stored thereon, without flow of gas into or out of said vessel; and a wheeled motive transport vehicular assembly of elongate form with a length and width, structurally coupled to the storage and dispensing vessel, and constructed and arranged for powered vehicular motive transport of the storage and dispensing vessel;

wherein the storage and dispensing vessel is substantially coextensive in length and width to the wheeled motive transport vehicular assembly.

2. A bulk vehicular transport fluid storage and dispensing system according to claim 1, further comprising a filling and dispensing assembly coupled in gas flow communication with the storage and dispensing vessel, and constructed and arranged to effect pressure differential-mediated desorption and/or thermally-mediated desorption of sorbable fluid from the solid-phase physical sorbent medium, and flow of desorbed fluid through the dispensing assembly.

3. A bulk vehicular transport fluid storage and dispensing system according to claim 2, further comprising a heating/cooling coil contained within the storage and dispensing vessel, the coil coupled in circuit-forming relationship to a source of heat exchange fluid.

4. A fluid storage and dispensing system according to claim 3, wherein the heat exchange fluid comprises a coolant for chilling the solid-phase physical sorbent medium to increase adsorption.

5. A bulk vehicular transport fluid storage and dispensing system according to claim 3, wherein the heat exchange fluid comprises a heated fluid for heating the solid-phase physical sorbent medium to thermally assist desorption.

6. A bulk vehicular transport fluid storage and dispensing system according to claim 1, wherein the physical sorbent medium comprises activated carbon.

7. A bulk vehicular transport fluid storage and dispensing system according to claim 1, wherein the gas reagent comprises a gas selected from the group consisting of silane, germane, ammonia, phosphine, arsine, stibine, hydrogen sulfide, hydrogen telluride, hydrogen selenide and gaseous halide compounds.

8. A bulk vehicular transport fluid storage and dispensing system according to claim 1, wherein the motive transport vehicular assembly includes a wheeled flat bed trailer for motive transport of the storage and dispensing vessel.

9. A bulk vehicular transport fluid storage and dispensing system according to claim 8, wherein the storage and dispensing vessel is detachably mounted to the flat bed trailer.

10. A bulk vehicular transport fluid storage and dispensing system according to claim 1, wherein the motive transport vehicular assembly comprises a railroad car for motive vehicular transport of the storage and dispensing vessel.

11. A bulk vehicular transport fluid storage and dispensing system according to claim 1, wherein the motive transport vehicular assembly comprises a rocket assembly.

12. A bulk vehicular transport fluid storage and dispensing system according to claim 1, wherein a plurality of storage and dispensing vessels are mounted to the motive transport vehicular assembly.

13. A bulk vehicular transport fluid storage and dispensing system according to claim 1, wherein the motive transport vehicular assembly comprises a ship.

14. A bulk vehicular transport fluid storage and dispensing system, comprising a vessel containing a sorbent material having sorptive affinity for a gas reagent which is desorbable by pressure-mediated desorption and/or thermally-mediated desorption of the gas reagent from the sorbent material, said vessel being constructed and arranged for flowing gas reagent out of said vessel without a simultaneous flow of gas into the vessel, with a gas reagent physically adsorbed on said sorbent material, and stored thereon without flow of gas into or out of said vessel, a motive transport vehicular assembly mounting the vessel thereon, an on-board refrigeration source on the motive transport vehicular assembly, an on-board heat source on the motive transport vehicular assembly, and means for selectively chilling and heating the sorbent material in the vessel with the on-board refrigeration source and the on-board heat source, respectively, wherein the motive transport assembly comprises a wheeled support structure for the vessel and is of elongate form having a length and width, the vessel is of elongate form, supported on said wheeled support structure along the length of the vessel, and substantially coextensive in length and width to the wheeled support structure.

15. A bulk vehicular transport fluid storage and dispensing system according to claim 14, wherein the motive transport vehicular assembly comprises a space vehicle.

16. A bulk vehicular transport fluid storage and dispensing system, comprising: a vehicle;

a storage and dispensing vessel mounted on said vehicle for transport by said vehicle during vehicular travel, said storage and dispensing vessel being constructed and arranged for holding a solid-phase physical sorbent medium, and for selectively flowing gas out of said vessel, without a simultaneous flow of gas into the vessel;

a solid-phase physical sorbent medium disposed in said storage and dispensing vessel; and a gas physically adsorbed on said solid-phase physical sorbent medium, and stored thereon without flow of gas into or out of said vessel, wherein the vehicle is of elongate form having a length and width, the vessel is of elongate form, supported on said vehicle along the length of the vessel, and substantially coextensive in length and width to the wheeled support structure.

17. A bulk vehicular transport fluid storage and dispensing system according to claim 16, wherein the motive transport vehicular assembly comprises a barge.

18. A system according to claim 16, wherein the gas is selected from the group consisting of hydride gases, halide gases, and gaseous organometallic Group V compounds.

19. A system according to claim 16, wherein the gas is selected from the group consisting of silane, germane, ammonia, phosphine, arsine, stibine, hydrogen sulfide, hydrogen telluride, hydrogen selenide and gaseous halide compounds.

20. A bulk vehicular transport fluid storage and dispensing system, comprising:

- a trailer unit constructed and arranged for coupling with a tractor unit to form a tractor-trailer, said trailer unit being of elongate form and comprising a wheeled support structure having a length and width;
- an elongate storage and dispensing vessel mounted on said trailer unit for transport by said tractor-trailer, said storage and dispensing vessel being substantially generally horizontally aligned and substantially coextensive in length and width with the trailer unit, and said storage and dispensing vessel being constructed and arranged for holding a solid-phase physical sorbent medium, and for selectively flowing gas out of said vessel, without a simultaneous flow of gas into the vessel;
- a solid-phase physical sorbent medium disposed in said storage and dispensing vessel; and
- a gas physically adsorbed on said solid-phase physical sorbent medium and stored thereon without flow of gas into or out of said vessel, said gas being selected from the group consisting of silane, germane, ammonia, phosphine, arsine, stibine, hydrogen sulfide, hydrogen telluride, hydrogen selenide and gaseous halide compounds.

* * * * *

UNITED STATES PATENT AND TRADEMARK OFFICE
CERTIFICATE OF CORRECTION

PATENT NO. : 5,961,697
DATED : October 5, 1999
INVENTOR(S) : McManus et al.

It is certified that error appears in the above-identified patent and that said Letters Patent is hereby corrected as shown below:

Column 9, line 42, change "des-" to -- de- --

Column 9, line 43, change "orbed-" to -- sorbed --.

Signed and Sealed this

Twenty-eighth Day of March, 2000

Attest:

Q. TODD DICKINSON

*Attesting Officer*      *Commissioner of Patents and Trademarks*